United States Patent [19]
Takano et al.

[11] Patent Number: 4,708,699
[45] Date of Patent: Nov. 24, 1987

[54] METHOD AND APPARATUS FOR REDUCING SOUND EMANATION FROM A DRIVE SYSTEM

[75] Inventors: Hiroshi Takano, Miki; Shinichi Takagi, Nishinomiya; Kiyokazu Wada, Miki; Sadaichi Konishi; Tomizo Kanaoka, both of Kobe, all of Japan

[73] Assignee: Mitsuboshi Belting Ltd., Nagata, Japan

[21] Appl. No.: 822,583

[22] Filed: Jan. 27, 1986

[51] Int. Cl.$^4$ ............................................. F16H 57/04
[52] U.S. Cl. ........................................ 474/144; 474/93
[58] Field of Search ................. 474/144, 146, 147, 93; 180/84; 74/608, 609; 280/160

[56] References Cited

U.S. PATENT DOCUMENTS

| | | | |
|---|---|---|---|
| 1,113,148 | 10/1914 | Altman | 474/146 |
| 3,885,471 | 5/1975 | Morine et al. | 474/144 |
| 4,509,933 | 4/1985 | Miranti, Jr. et al. | 474/93 |
| 4,530,680 | 7/1985 | Miranti, Jr. | 474/93 |
| 4,531,928 | 7/1985 | Ikenoya | 474/93 |

FOREIGN PATENT DOCUMENTS

| | | | |
|---|---|---|---|
| 0109762 | 6/1983 | Japan | 474/93 |
| 0054856 | 3/1984 | Japan | 474/93 |

Primary Examiner—Stephen J. Novosad
Assistant Examiner—Thuy M. Bui
Attorney, Agent, or Firm—Wood, Dalton, Phillips, Mason & Rowe

[57] ABSTRACT

An apparatus and method for effectively minimizing sound emanation from a power transmission belt drive and providing extended useful life of the power transmission belt by reducing the operating temperature thereof. In the illustrated embodiment, the drive system is enclosed in a housing having one or more inlets and one or more outlets. Air moving structure is provided in association with the pulleys for causing air flow through the interior of the housing from the inlets to the outlets as an incident of operation of the drive system. In the illustrated embodiment, the pulleys are formed of heat conducting material so as to transfer heat from the belt to the air being flowed through the interior of the housing, thereby reducing the operating temperature of the belt. A sound absorber may be provided within the housing and, in the illustrated embodiment, sound absorbing means are provided on the inner surfaces of the housing, the inlets and outlets, and may be provided internally of conduits which may be coupled to the inlets and outlets as desired. Fans may be provided in the inlet and/or outlet for augmented air flow through the housing.

20 Claims, 7 Drawing Figures

METHOD AND APPARATUS FOR REDUCING SOUND EMANATION FROM A DRIVE SYSTEM

DESCRIPTION

1. Technical Field

This invention relates to drive systems, and in particular to belt drive systems.

2. Background Art

One conventional form of drive system, such as a power transmission drive system, includes a driver pulley and a driven pulley interconnected by a flexible belt entrained about the pulleys.

Where high force transmission is desired, it is conventional to stiffen the flexible belt against transverse expansion. It has been found that such stiffening of the belt increases the sound level generated by the belt engaging the pulleys during operation of the drive system. In many applications, such as where the belts are used in automobile drive systems, such an increase in the noise level is highly undesirable and is a vexatious problem in the art.

One attempted solution to this problem has been to enclose the drive system in a housing tending to capture a substantial portion of the sound so generated. A problem arises, however, in such enclosed systems in that heat generated by the friction between the belt and pulley faces and the flexing of the belt itself raises the temperature within such an enclosure excessively, thereby shortening the useful life of the belt.

DISCLOSURE OF INVENTION

The present invention comprehends a method and apparatus for effectively reducing the sound emanations from an operating belt drive system in a novel and simple manner while maintaining long, troublefree life of the drive belt.

More specifically, the invention comprehends the provision of such a method of reducing sound emanations including the steps of substantially fully enclosing the drive system in a sound-retaining enclosure, and causing the drive system to pass air through the enclosure in heat transfer association with the drive system as an incident of operation of the drive system.

The invention further comprehends the provision in a drive system having a drive belt entrained about drive pulleys of apparatus for reducing sound emanations from the operating drive system, including sound-retaining enclosure means for substantially fully enclosing the drive system, and means associated with the drive system for passing air through the enclosure means in heat transfer association with the drive system as an incident of operation of the drive system.

More specifically, the invention comprehends providing a drive system having a drive belt entrained about drive pulleys defining sides and a periphery, apparatus for reducing sound emanations from the operating drive system, including air moving means mounted to at least one of the pulleys, thin wall enclosure means for enclosing the drive system, air inlet means opening through the enclosure means to adjacent the pulley carrying the air moving elements, and air outlet means opening through the enclosure means to adjacent the periphery of the pulley carrying the air moving means to discharge from enclosure means air moved by the air moving elements.

Additional air moving means may be provided in association with at least one of the inlet and outlet ports.

In the illustrated embodiment, sound absorbing means may be provided on the inner surface of the enclosure means.

In the illustrated embodiment, conduits are provided connected to the inlet and outlet ports and sound absorbing means may be provided further within the conduits.

In the illustrated embodiment, the air moving means comprises air moving elements, such as vanes, carried by one or more of the drive system pulleys. The air inlet and outlet ports are arranged relative to the air moving means on the pulleys such that the pulleys act to draw air inwardly through an air inlet port and direct air outwardly through an air outlet port.

In the illustrated embodiment, the vanes are arranged to act in the manner of a centrifugal blower in moving the air through the enclosure means between the inlet and outlet ports.

The air moving means may be mounted on each of the driver and driven pulleys as desired.

In the illustrated embodiment, the enclosure means is formed of thin wall material, such as sheet metal, synthetic resin, and the like.

In the illustrated embodiment, the air moving means causes at least a portion of the air to pass in heat transfer association with the enclosure means.

The air moving means may comprise thermally conductive vanes mounted to the pulleys for further transferring heat from the pulleys to the air being flowed through the enclosure means, thereby reducing the temperature of the pulleys and further improving the troublefree life of the belt.

The method and apparatus of the present invention are extremely simple and economical while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
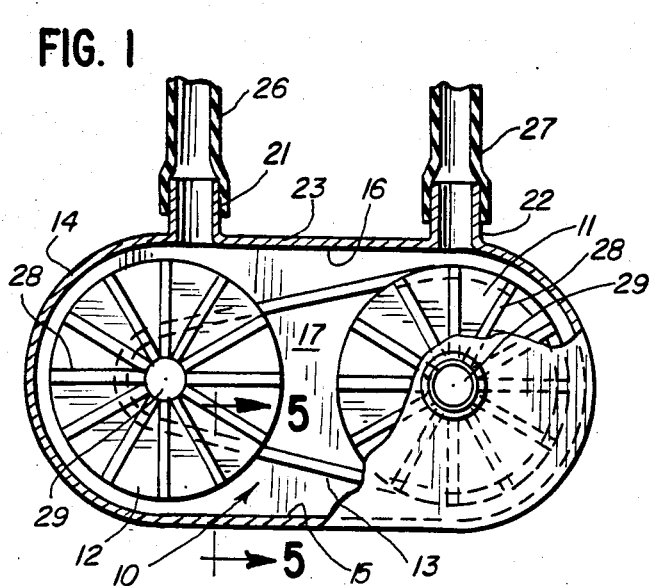
FIG. 1 is a vertical section of a drive system apparatus embodying the invention.
Figure 3:
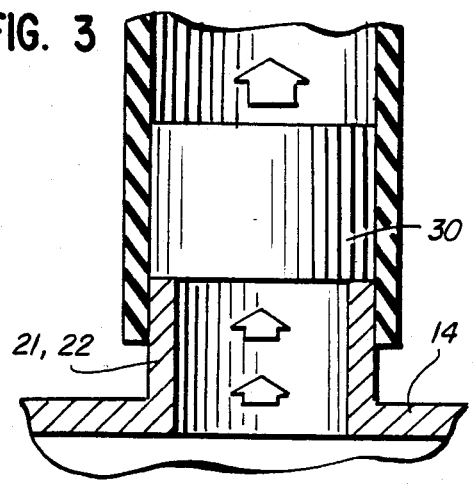
FIG. 3 is a fragmentary enlarged horizontal section illustrating provision of an air moving means in the outlet.

In the illustrative embodiment of the invention as disclosed in the drawing, a drive system generally designated 10 is shown to comprise a pair of pulleys 11 and 12 interconnected by a power transmission V-belt 13. The drive system is adapted to transmit relatively high power and, thus, illustratively, is adapted for use in high performance automobile engines and the like.

The V-belt may be of any conventional construction having high transverse rigidity, permitting the transmission of high loads with minimum wear.

As discussed briefly above, such power transmission belt systems raise the serious problem of substantial noise. The present invention is concerned with the provision of means in association with such a high power transmission belt system which minimizes the noise emanating therefrom and which does so in a novel, simple, and economical manner.

More specifically, as shown in FIG. 1, the invention comprehends enclosing the drive system 10 within an enclosure, or housing, 14 adapted to minimize emanation of sound from the operating drive system. It is preferred that the housing 14 completely enclose the drive system for maximum sound reduction.

The invention further comprehends the provision of sound absorbing means within the housing and, in the illustrated embodiment, such sound absorbing means comprises a layer of sound absorbent material 15 on the inner surfaces 16 of the housing.

The invention further comprehends the provision of means for circulating air through the housing for cooling the drive system during operation thereof, thereby effectively increasing the useful life of the belt 13.

Figure 2:
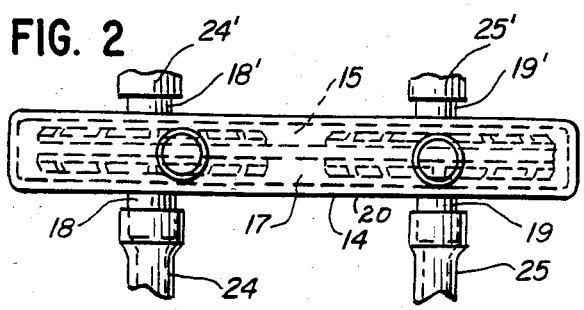
FIG. 2 is a horizontal section thereof.
Figure 4:
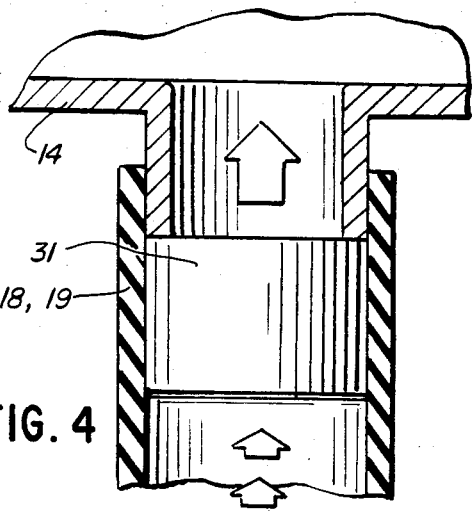
FIG. 4 is a fragmentary horizontal section illustrating the provision of an air moving means in the inlet.

More specifically, as seen in FIGS. 1 and 2, air is delivered into the interior space 17 of the housing through a pair of inlets 18 and 19 in a sidewall 20 of the housing. Air is exhausted from the interior space 17 through a pair of outlets 21 and 22 in an edge wall 23 of the housing.

In the illustrated embodiment, conduits 24 and 25 are coupled to the annular inlets 18 and 19 for delivery of air from remotely of the drive system. Alternatively, where the system is utilized in an automobile having a radiator fan, the inlets may be exposed to the air stream from the radiator fan.

Conduits 26 and 27 may be provided coupled to the outlets 21 and 22, respectively. The ends of the conduits 24–27 may be located as desired to provide controlled sound emission therefrom.

The invention comprehends the provision of vanes 28 on the pulleys 11 and 12 defining air flow means providing a positive air flow from the inlets 18 and 19 to the outlets 21 and 22 of the housing. In the illustrated embodiment, the vanes extend radially from the hub 29 of the respective pulleys. The air inlets 18 and 19 are located coaxially of the hubs so as to introduce the air into the housing interior space 17 at the radially inner end of the vanes to be urged thereby radially outwardly to the outlets 21 and 22 in the manner of a centrifugal blower. For this purpose, the outlets are located and open towards the peripheries of the pulleys so as to efficiently receive the air delivered by the vanes and thereby provide for an efficient flow of cooling air through the interior of the housing in heat transfer association with the vanes, the pulleys, the belt, and the walls of the housing.

Figure 5:
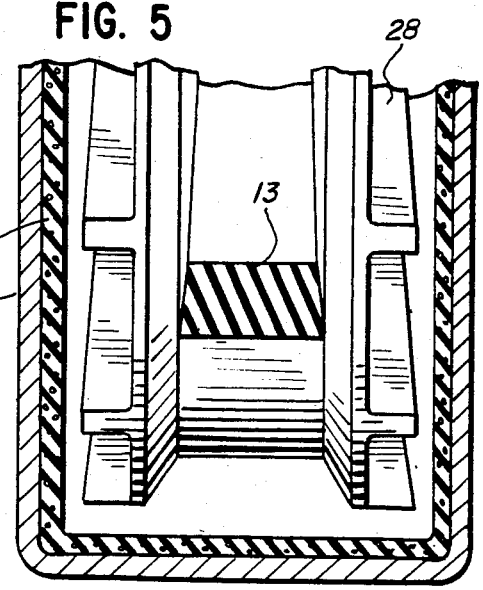
FIG. 5 is a fragmentary enlarged vertical section taken substantially along the line 5—5 of FIG. 1.

In the illustrated embodiment, vanes 28 are provided at opposite sides of the pulleys, as illustrated in FIG. 5. Air inlets may be correspondingly provided at opposite sides of the pulleys, as illustrated in FIG. 2, wherein the air inlets and conduits are designated by similar prime numbers.

The invention comprehends that the sound deadening material 15 may be provided on the inner surfaces of the inlets and outlets and may be similarly provided within the conduits 24–27 when utilized.

In the illustrated embodiment, the housing is made of thin wall material, such as sheet metal, synthetic resin sheet, and illustratively, may have a thickness in the range of 1 to 10 mm. The sound absorbing material may comprise foamed resin, glass fibers, and other suitable sound absorbing materials which may be bonded onto the inner surfaces of the housing, inlets and outlets, and conduits, as discussed above.

The invention comprehends that the drive system may comprise any desirable form of pulleys and power transmission belt. The pulleys may be formed of any suitable pulley material, such as aluminum, iron, synthetic resin, and in the illustrated embodiment, comprise cast pulleys having the vanes formed integrally in one side thereof.

As will be obvious to those skilled in the art, the invention comprehends also the use of separately formed vanes mechanically secured to the pulleys. If desired, a second set of inlets may be provided and a second set of vanes provided on the opposite side of the housing and pulleys for further improved air flow through the apparatus. Similarly, additional outlets may be utilized as desired within the scope of the invention.

The provision of the air flow vanes directly on the pulleys assures a positive air flow through the system whenever the system is operating.

If desired, additional air flow means may be provided, such as fan 30 at the outlets 21,22 and/or a fan 31 at the inlets 18,19.

Figure 6:
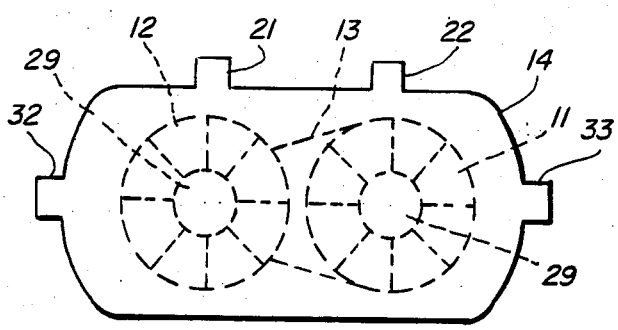
FIG. 6 is a schematic illustrating a test system for use in determining the characteristics of the invention.
Figure 7:
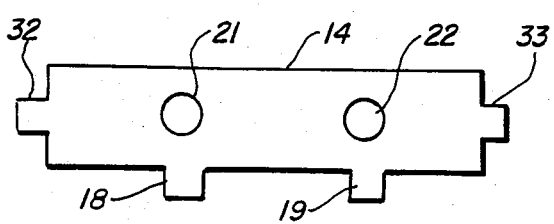
FIG. 7 is a top plan view of the apparatus of FIG. 6.

The reduction in noise emanating from the drive system and the temperature of the power transmission belt in the operation of the drive system, when utilizing the invention, is illustrated relative to the experimental arrangement shown in FIGS. 6 and 7. As shown therein, the drive pulley 11 defined a 170 mm. diameter, the driven pulley 12 defined a 90 mm. diameter, and the power transmission belt 13 comprised a V-belt having a length of 850 mm., with the pulley 11 being rotated at 4500 rpm. The sound pressure exteriorly of the housing and the temperature of the belt were measured under different air flow conditions, and the results thereof tabulated in the following Table 1:

TABLE 1

|   | A | B | C | D | E | F | Sound Pressure (db)* | Temp. of belt (°C.) |
|---|---|---|---|---|---|---|---|---|
| No cover |  |  |  |  |  |  | 120 | 80 |
| 1 | x | x | x | x | x | x | 78 | 150 |
| 2 | o | o | x | x | x | x | 86 | 67 |
| 3 | o | o | o | o | x | x | 89 | 65 |
| 4 | o | o | o | o | o | o | 91 | 63 | o: Open
x: Closed
*: Mechanical vibration inclusive

As shown in FIG. 6, the test enclosure 14 was provided with a second set of outlets 32 and 33 at the opposite ends of the enclosure aligned with the axes of the hubs 29 of the pulleys.

As shown in the Table, the second pressure was reduced by at least 25% by means of the enclosure. The temperature of the belt was reduced by approximately 20% when the enclosure was provided with a pair of inlets and a pair of outlets from the temperature of the belt in the system without the enclosure, and was reduced by over 50% as compared to the system when all of the inlet and outlet openings were closed.

Thus, as can be seen from Table 1, a substantial reduction in the sound emanating from the drive system and a concurrent substantial reduction in the operating temperature of the belt is provided by the invention.

The foregoing disclosure of specific embodiments is illustrative of the broad inventive concepts comprehended by the invention.

We claim:

1. The method of reducing sound emanation from an operating drive system having a drive belt entrained about driver and driven pulleys, comprising the steps of:
    substantially fully enclosing the drive system in an enclosure;
    absorbing sound inwardly of said enclosure; and causing the drive system to pass air through the enclosure in heat transfer association with said drive system as an incident of operation of the drive system.

2. In a drive system having a drive belt entrained about drive pulleys, apparatus for reducing sound emanation from the operating drive system comprising:
    thermally conductive air moving elements on a side of one of said pulleys, said one of said pulleys being formed of thermally conductive material;
    sound absorbing means surrounding the drive system;
    air inlet means opening through the sound absorbing means to adjacent said air moving elements; and
    air outlet means opening through the sound absorbing means to adjacent said air moving means to discharge from said enclosure means air to which heat from the drive belt and pulley is transferred by said air moving elements.

3. In a drive system having a drive belt entrained about drive pulleys defining opposite sides and a periphery, apparatus for reducing sound emanation from the operating drive system comprising:
    thermally conductive air moving elements mounted to said opposite sides of at least one of said pulleys;
    enclosure means for enclosing the drive system;
    air inlet means opening through the enclosure means to adjacent said air moving elements; and
    air outlet means opening through the enclosure means to adjacent the periphery of the pulley carrying the air moving means to discharge from said enclosure means air moved by said air moving elements, said thermally conductive air moving elements comprising means for limiting the temperature of said drive belt to below a preselected temperature by transferring heat from said drive belt to said air moved by said air moving elements.

4. The method of reducing sound emanation of claim 1 including the further step of conducting heat from the drive belt to at least one of the pulleys, and providing thermally conductive means on said at least one of said pulleys to conduct the heat from the belt to the air being passed through the enclosure.

5. The method of reducing sound emanation of claim 1 including the further step of providing air inlet and outlet ports in said enclosure and providing elongated conduits communicating with said ports and extending substantially therefrom.

6. In a drive system having a drive belt entrained about drive pulleys, apparatus for reducing sound emanation from the operating drive system comprising:
    enclosure means for substantially fully enclosing the drive system;
    means disposed inwardly of said enclosure for absorbing sound; and
    means associated with the drive system for passing air through the enclosure means in heat transfer association with said drive system and sound absorbing means as an incident of operation of the drive/system.

7. The drive system apparatus of claim 6 wherein air inlet and outlet ports are provided in said enclosure means, and air moving means are provided in association with at least one of said ports.

8. The drive system apparatus of claims 2 or 3 further including supplemental air moving means for forcibly urging air into said enclosure means through said air inlet means.

9. The drive system apparatus of claim 6 wheren said sound absorbing means is carried on said enclosure means.

10. The drive system apparatus of claim 6 wherein air inlet and outlet ports are provided in said enclosure means and further including conduit means connected to said ports.

11. The drive system apparatus of claim 6 wherein air inlet and outlet ports are provided in said enclosure means and air transfer means are provided at said inlet port.

12. The drive system apparatus of claim 6 wherein air inlet and outlet ports are provided in said enclosure means and air transfer means are provided at said outlet port.

13. The drive system apparatus of claim 6 wherein air inlet and outlet ports are provided in said enclosure means and said pulleys define sides and said ports include at least one inlet port opening to adjacent one of said pulley sides.

14. The drive system apparatus of claim 6 wherein said means for passing air comprises thermally conductive air moving vanes on at least one of said pulleys.

15. The drive system apparatus of claim 6 wherein said means for passing air comprises thermally conductive air moving vanes on at least one of said pulleys, said vanes defining centrifugal air moving means.

16. The drive system apparatus of claim 6 wherein air inlet ports are provided in said enclosure means opening to opposite sides of at least one of said pulleys.

17. The drive system apparatus of claims 2 or 3 further including supplemental air moving means for forcibly exhausting air from said enclosure means through said outlet means.

18. The drive system apparatus of claim 3 wherein said at least one of the pulleys is formed of thermally conductive material and defines means for conducting heat from the drive belt to said air moving elements.

19. The drive system apparatus of claim 3 further including sound absorbing means carried by said inner surface.

20. The drive system apparatus of claims 2 or 3 further including conduit means connected to said air inlet and air outlet means, said conduit means being internally lined with sound absorbing means.

* * * * *